… … …

United States Patent [19]

Iwamoto

[11] Patent Number: 5,126,406

[45] Date of Patent: Jun. 30, 1992

[54] THERMOSETTING RESIN COMPOSITION AND ARTICLE OBTAINED THEREFROM

[75] Inventor: Norikazu Iwamoto, Kobe, Japan

[73] Assignee: Nippon Paint Co., Ltd., Osaka, Japan

[21] Appl. No.: 663,153

[22] Filed: Mar. 1, 1991

[30] Foreign Application Priority Data

Mar. 2, 1990 [JP] Japan .................................. 2-52551

[51] Int. Cl.$^5$ ...................... C08G 18/00; C08G 18/04; C08L 79/04; C08F 8/30
[52] U.S. Cl. ..................................... 525/123; 525/187
[58] Field of Search .............................. 525/123, 187

[56] References Cited

U.S. PATENT DOCUMENTS

| | | | |
|---|---|---|---|
| 4,396,753 | 8/1983 | Holubka | 528/45 |
| 4,424,316 | 1/1984 | DiSalvo et al. | 528/59 |
| 4,436,890 | 3/1984 | Kaufman | 528/73 |
| 4,442,146 | 4/1984 | Holubka | 528/45 |
| 4,463,143 | 7/1984 | Holubka | 528/45 |

*Primary Examiner*—John Kight, III
*Assistant Examiner*—Rabon Sergent

[57] ABSTRACT

Disclosed is a thermosetting epoxy resin composition which has excellent mechanical properties, such as heat resistance and impact resistance. The thermosetting resin composition of the present invention comprises (a) a polyisocyanate compound, (b) a polyepoxide compound, (c) a radical polymerizable compound selected from the group consisting of a vinyl aromatic monomer and a (meth)acrylate represented by $$CH_2=CR_1-CO-OR_2$$

wherein $R_1$ represents a hydrogen atom or a methyl group, $R_2$ represents an aliphatic group having 4 to 18 carbon atoms, an alicyclic group or an aromatic group, (d) a specific oxazolidone-forming catalyst, and (e) a radical polymerization initiator; the polyisocyanate compound (a) and polyepoxide compound (b) being present in a functional group equevalent ratio of isocyanate group:epoxy group within the range of 1:2 to 2:1 and the radical polymerizable compound (c) being present in an amount of about 1 to 100 parts by weight based on the total amount of the polyisocyanate compound (a) and the polyepoxide compound. The present invention also provides a cured article obtained from the thermosetting resin composition of the present invention.

19 Claims, No Drawings

THERMOSETTING RESIN COMPOSITION AND ARTICLE OBTAINED THEREFROM

FIELD OF THE INVENTION

The present invention relates to a novel thermosetting resin composition having excellent heat resistance and toughness, and an article obtained from the resin composition.

BACKGROUND OF THE INVENTION

Thermosetting resin compositions are employed for casting, impregnating, laminating, molding, insulation materials, structural materials, coating or adhesives. The compositions have strict requirements in physical properties and especially heat resistance and toughness have become more important. It, however, is very difficult to improve both heat resistance and toughness, because it is usual that the composition having high heat resistance has poor toughness and the composition having high toughness adversely has poor heat resistance.

It is also known that an article prepared from polyisocyanate and polyepoxide exhibits good heat properties. The cured article obtained from polyisocyanate and polyepoxide has good heat resistance but is stiff and fragile, especially poor in impact strength. It is believed that the heat resistance is given by oxazolidone groups and cyclic structures from isocyanurate groups which are produced when curing, and that the poor impact strength is given by highly crosslinked structure from trimerized isocyanurate groups.

The oxazolidone cyclizing reaction is conducted in the presence of a catalyst or at an elevated temperature in the absence of an catalyst. Typical catalysts are tertiary amines (e.g. imidazole, hexamethylenetetramine), quaternary ammonium salts (e.g. tetraethylammonium iodide), a complex of a Lewis acid and a base (e.g. aluminum chloride and pyrolidone, aluminum chloride and phosphate), lithium halide, a complex of lithium halide and phosphoric acid (e.g. lithium bromide and tributylphosphine oxide) and the like. As the catalyst, a complex of an organotin halide and a Lewis salt or stibonium is also proposed by Matsuda et al. in J. Org. Chem. pp 2177-2185, 51(12), 1986 and Chemistry Letters, pp 1963-1966, 1986. Japanese Kokoku Publication 500730/1987 to Marks Morris et al. further discloses an organoantimony iodide as a catalyst for preparing a polyoxazolidone resin.

Japanese Kokoku Publication 287126/1989 discloses a complex of an organotin halide and stibonium as a catalyst which provides a cured article having improved impact resistance and good heat resistance. The performance, e.g. improved impact resistance, is still insufficient and further improvements are required.

Since vinyl resins have good impact resistance and toughness, it is also proposed that the polyoxazolidone resin is mixed with the vinyl resins to improve impact resistance. However, the polyoxazolidone resin is poor solubility in solvent and it is difficult to mix it with the vinyl resin in liquid condition. Since the polyoxazolidone resin has poor compatibility with the vinyl resins, cold blending is also impossible.

SUMMARY OF THE INVENTION

The present invention provides a thermosetting epoxy resin composition which has excellent mechanical properties, such as heat resistance and impact resistance. The thermosetting resin composition of the present invention comprises:

(a) a polyisocyanate compound,
(b) a polyepoxide compound,
(c) a radical polymerizable compound selected from the group consisting of a vinyl aromatic monomer and a (meth)acrylate represented by

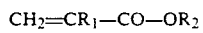

$$CH_2=CR_1-CO-OR_2$$

wherein $R_1$ represents a hydrogen atom or a methyl group, $R_2$ represents an aliphatic group having 4 to 18 carbon atoms, an alicyclic group or an aromatic group, (d) an oxazolidone-forming catalyst selected from the group consisting of a complex of an organotin halide and hexamethylphosphorictriamide, a complex of an organotin halide and an onium salt, a complex of a stibonium salt and a zinc halide, a complex of an organoantimony halide and an organotin halide and a complex of an organoantimony halide and a zinc halide, and (e) a radical polymerization initiator; the polyisocyanate compound (a) and polyepoxide compound (b) being present in a functional group equivalent ratio of isocyanate group: epoxy group within the range of 1:2 to 2:1 and the radical polymerizable compound (c) being present in an amount of about 1 to 100 parts by weight based on the total amount of the polyisocyanate compound (a) and the polyepoxide compound.

The present invention also provides a cured article obtained from the thermosetting resin composition of the present invention.

DETAILED DESCRIPTION OF THE INVENTION

The polyisocyanate compound (a) employed in the present invention includes an aromatic polyisocyanate and an aliphatic or alicyclic polyisocyanate. Typical examples of the aromatic polyisocyanates are toluene diisocyanate, naphthalene diisocyanate, tolidine diisocyanate, diphenylmethane diisocyanate and the like. Typical examples of the aliphatic or alicyclic polyisocyanates are hexamethylene diisocyanate, hydrogenated diphenylmethane diisocyanate, isophorone diisocyanate, hydrogenated tolylene diisocyanate and the like. The polyisocyanate compound (a) may also be an isocyanate group-terminated prepolymer or a modified polyisocyanate. The isocyanate group-terminated prepolymer may be prepared by reacting the above listed polyisocyanate compound with an active hydrogen containing compound. The modified polyisocyanate may contain urea groups, allophanate groups, biuret groups or isocyanurate cyclic groups. The above mentioned polyisocyanate compound can be used solely or in combination.

The polyepoxide compound of the present invention has at least two epoxy groups in one molecule and can be aliphatic, alicyclic, aromatic or heterocyclic. It is preferred that the polyepoxide compound has 2 to 4 epoxy groups, more preferably 2 epoxy groups, in one molecule and an epoxy equivalent of 90 to 500, more preferably 170 to 220, in view of viscosity, workability and heat resistance. Typical examples of the polyepoxides are a diglycidyl ether of bisphenol A prepared from bisphenol A or halogenated bisphenol A and epihalohydrine; a diglycidyl ether of bisphenol F; a resin derived from a polynuclear phenol glycidyl ether; an epoxide phenyl novolac resin; an aromatic glycidylamine resin derived from an aromatic amine and epichlorohydrine; a glycidyl ester resin of a polybasic aromatic, aliphatic or alicyclic carboxylic acid; a glycidyl ether of a reaction product from an aromatic or alicyclic dicarboxylic acid and a polyol; a glycidyl ether of a polyol; an epoxidized cycloolefin; an epoxidized unsaturated compound from plant oil or a modified thereof; an epoxide of a silicate compound; a mixture thereof and the like.

The physical properties of the polyoxazolidone resin are varied by a relative amount ratio of polyepoxide and polyisocyanate. Stoichiometrically excess amounts of the polyisocyate provide an oxazolidone polymer having isocyanate groups at terminal (i.e. isocyanate terminated oxazolidone polymer), and stoichiometrically excess amounts of the polyepoxide provide an oxazolidone polymer having epoxy groups at terminal (i.e. epoxy terminated oxazolidone polymer). The polyepoxide and polyisocyanate are employed in an equal equivalent to result in an oxazolidone polymer having higher molecular weight. In order to obtain an article having excellent physical properties, such as excellent heat resistance and excellent impact resistance, it is preferred that the oxazolidone polymer has a high molecular weight. It is therefore preferred that an equivalent ratio of isocyanate group: epoxy group is about 1:1, more preferably within the range of 1:2 to 2:1. As is mentioned above, the polyoxazolidone resin itself has good impact resistance, but insufficient for several usages, so that in the present invention a specific vinyl resin is polymerized when the polyoxazolidone resin is formed to improve impact resistance.

Many oxazolidone-forming catalysts, which are used for reacting the polyisocyanate and the polyepoxide, have been proposed, but in the present invention the following catalysts are employed. The catalysts are selected from the group consisting of a complex of an organotin halide and hexamethylphosphoricamide, a complex of an organotin halide and an onium salt, a complex of a stibonium salt and a zinc halide, a complex of an organoantimony halide and an organotin halide and a complex of an organoantimony halide and a zinc halide.

The organotin halide is generally represented by the following formula (1)

$$R_mSnX_{(4-m)} \tag{1}$$

wherein X represents a halogen atom, such as bromine and iodine, m is an integer of 1 to 3, R respectively represents an aliphatic group, an aromatic group and an alicyclic group.

Typical examples of the organotin halides are trimethyltin iodide, trimethyltin bromide, dimethyltin diiodide, dimethyltin dibromide, tripropyltin iodide, tripropyltin bromide, dipropyltin diiodide, dipropyltin dibromide, tributyltin iodide, tributyltin bromide, dibutyltin diiodide, dibutyltin dibromide, trioctyltin iodide, trioctyltin bromide, dioctyltin diiodide, dioctyltin dibromide, triphenyltin iodide, triphenyltin bromide, diphenyltin diiodide, diphenyltin dibromide, tricyclohexyltin iodide, tricyclohexyltin bromide, dicyclohexyltin diiodide, dicyclohexyltin dibromide and the like.

The onium salt includes ammonium, phosphonium, stibonium, which is represented by the following formula (2).

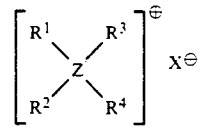

wherein Z is N, P or Sb, $R^1$ to $R^4$, which are same or different, represent an organic group, X represent a halogen atom.

Examples of the ammonium compounds are tetramethylammonium iodide, tetramethylammonium bromide, tetraethylammonium iodide, tetraethylammonium bromide, tetrapropylammonium iodide, tetrapropylammonium bromide, tetrabutylammonium iodide, tetrabutylammonium bromide, tetraisoamylammonium iodide, tetraisoamylammonium bromide, tetrapentylammonium iodide, tetrapentylammonium bromide, methyltriethylammonium iodide, methyltriethylammonium bromide, trimethylphenylammonium iodide, trimethylphenylammonium bromide, trimethylbenzylammonium iodide, trimethylbenzylammonium bromide and the like. Examples of the phosphonium compounds are tetrabutylphosphonium iodide, tetrabutylphosphonium bromide, tetraphenylphosphonium iodide, tetraphenylphosphonium bromide, butyltriphenylphosphonium iodide, butyltriphenylphosphonium bromide, methyltriphenylphosphonium iodide, methyltriphenylphosphonium bromide, tributylphenylphosphonium iodide, tributylphenylphosphonium bromide and the like. Examples of the stibonium compounds are tetraphenylantimony iodide, tetraphenylantimony bromide, tetrabenzylantimony iodide, tetrabenzylantimony bromide, tetrabutylantimony iodide, tetrabutylantimony bromide and the like.

The organoantimony halide employed as the catalyst has the following formula (3).

$$R_3SbX_2$$

wherein X represents a halogen atom, such as bromine and iodine, R respectively represents an aliphatic group, an aromatic group or an alicyclic group.

Typical examples of the organoantimony halides are triphenylantimony diiodide, triphenylantimony dibromide, tribenzylantimony diiodide, tribenzylantimony dibromide, tributylantimony diiodide, tributylantimony dibromide and the like.

In the present invention, the catalyst is a complex of two of the above mentioned components and can be prepared by mixing about equimolar amount of the two components at room temperature to 150° C. in the presence or absence of a solvent. In the thermosetting composition of the present invention, the catalyst may be formed with a solvent to a package independent from the polyisocyanate (a) and the polyepoxide (b) and may be formulated into the polyisocyanate (a) or the polyepoxide (b).

The catalyst may be present in the composition in an amount of 0.01 to 10 parts by weight, preferably 0.1 to 5 parts by weight, based on 100 parts by weight of the mixture of the polyepoxide and the polyisocyanate. If necessary, another art-known catalyst can be mixed with the above specified catalyst.

It has been also found that each catalyst constituent material, i.e. each of the reactants before forming the complex catalyst, is mixed with either the polyepoxide or the polyisocyanate without forming the complex catalyst, wherein the polyepoxide or the polyisocyanate is used as a solvent of the catalyst constituent material. Upon reacting, the catalyst constituent materials are mixed to form the complex catalyst by which the reaction of the polyepoxide and the polyisocyanate is promoted. When the complex catalyst is mixed with the polyepoxide or the polyisocyanate, the storage stability of the solution may be damaged to cause problems in industrial usage. It is therefore important that the catalyst constituent material can be formulated into them and storage stability is not damaged. For example, when the catalyst is a complex of the organoantimony halide and organotin halide, it is preferred that the organotin halide is mixed with the polyisocyanate component and the organoantimony halide is mixed with the polyepoxide component. When the catalyst is a complex of the organoantimony halide and zinc halide, it is preferred that the organoantimony halide is mixed with the polyisocyanate component and the zinc halide is mixed with the polyepoxide component. In other words, the catalyst system of the present invention does not lose the catalytic activity even if the catalyst constituent materials are separated before polymerization, and the storage stability of each component is not suffered.

The oxazolidone-forming catalyst of the present invention can form oxazolidone rings under mild conditions and hardly produces by-products in comparison with conventional type curable resin composition.

The radical polymerizable compound is selected from the group consisting of a vinyl aromatic monomer and a (meth)acrylate represented by

$$CH_2=CR_1-CO-OR_2 \qquad (4)$$

wherein $R_1$ represents a hydrogen atom or a methyl group, $R_2$ represents an aliphatic group having 4 to 18 carbon atoms, an alicyclic group or an aromatic group. Examples of the monomers are alkyl (meth)acrylates, e.g. n-butyl (meth)acrylate, isobutyl (meth)acrylate, t-butyl (meth)acrylate, amyl (meth)acrylate, hexyl (meth)acrylate, 2-ethylhexyl (meth)acrylate, lauryl (meth)acrylate, stearyl (meth)acrylate etc.; cyclohexyl (meth)acrylate; isobornyl (meth)acrylate; dicyclopentenyloxyethyl (meth)acrylate; phenyl (meth)acrylate; phenyloxyethyl (meth)acrylate; and the like. Examples of the vinyl aromatic monomers are styrene, alpha-methylstyrene, vinyltoluene, vinylxylene, vinylstyrene and the like.

The radical polymerizable compound (c) may contain other copolymerizable compounds. Typical examples of the other copolymerizable compounds are unsaturated carboxylic esters (e.g. (meth)acrylates other than the formula (4), for example, methyl (meth)acrylate, ethyl (meth)acrylate, propyl (meth)acrylate and isopropyl (meth)acrylate, ethyleneglycol di(meth)acrylate, diethyleneglycol di(meth)acrylate, 1,4-butanediol di(meth)acrylate, 1,6-hexanediol di(meth)acrylate, neopentylglycol di(meth)acrylate, polyethyleneglycol di(meth)acrylate, polyethyleneglycol di(meth)acrylate (molecular weight=200 to 2,000), polypropyleneglycol di(meth)acrylate (molecular weight=200 to 2,000), trimethylolpropane tri(meth)acrylate, bisphenol A tetraethyleneglycol di(meth)acrylate, bisphenol A tetrapropyleneglycol di(meth)acrylate etc.), unsaturated nitriles (e.g. acrylonitrile, alpha-chloroacrylonitrile, methacrylonitrile, ethacrylonitrile, maleic dinitrile, fumaric dinitrile etc.), vinyl ethers (e.g. methyl vinyl ether, ethyl vinyl ether, propyl vinyl ether, butyl vinyl ether, butyl vinyl ether, methyl isopropenyl ether, ethyl isopropenyl ether etc.), vinyl esters (e.g. vinyl acetate, vinyl propionate etc.), allyl esters (e.g. allyl benzoate, diallyl phthalate, diallyl isophthalate etc.), unsaturated polyesters (e.g. compounds prepared from an unsaturated dibasic acid (maleic acid, fumaric acid, phthalic acid etc.) and a dihydric alcohol (propylene glycol, ethylene glycol etc.)), a mixture thereof and the like. The unsaturated polyesters may be prepared by art-known methods (see "Lecture of Plastic Materials [10]" by Eiichiro Takiyama, Nikkan Kogyo Shinbun Co., Ltd.).

The radical polymerizable compound (c) is present in an amount of about 1 to 100 parts by weight based on the total amount of the polyisocyanate compound (a) and the polyepoxide compound (b). Amounts of less than about 1 part by weight reduces toughness and amounts of more than about 100 parts by weight reduce heat resistance and have larger volume construction when curing.

In order to polymerize the above mentioned monomers, the resin composition of the present invention contains a radical polymerization initiator which is known to the art, including benzoylperoxide, t-buty octanoate, cumene hydroperoxide, azoisobutylonitrile and the like. The initiator may be present in a small amount, preferably about 0.1 to about 10 parts by weight based on 100 parts by weight of the total amount of the monomers.

The thermosetting resin composition of the present invention contains the polyisocyanate compound (a), the polyepoxide compound (b), the radical polymerizable compound (c), the oxazolidone-forming catalyst (d) and a radical polymerization initiator (e), wherein the oxazolidone-forming catalyst (d) may be divided to formulate into each constructive component of the composition. The composition may be divided into two or more packages, provided that the radical polymerization initiator (e) is separated from the radical polymerizable compound (c) and the polyisocyanate compound (a) is separated from the polyepoxide compound (b).

According to the second embodiment of the present invention, the thermosetting resin composition is mixed at room temperature to 150° C. in a mold to conduct the formation of polyoxazolidone resin and vinyl resin, thus obtaining a composite resin article having excellent heat resistance and good impact resistance. The reaction temperature is preferably within the range of 40° to 150° C., more preferably 60° to 120° C., although it may be widely varied by the sort of each component. The resulting resin article is preferably post-cured at 100° to 300° C., more preferably 120° to 200° C. The reaction may be carried out in batch processing or continuous processing. Molding can be carried out by a one shot method or prepolymer method, because the catalysts are divided and formulated into each component package. Preferred molding is vacuum defoam molding or reaction injection molding, although the other methods can be employed.

In addition to the above mentioned components, the thermosetting resin composition may contain other additives, such as fillers, reinforcing fiber, anti-oxidants, fire-retardants, mold release agents, pigments, surfactants, blowing agents and the like.

It is known to the art that two or more different polymerization reactions are simultaneously or continuously carried out to form a resin in which plural different polymers are interpenetrated and that the plural different polymers are not chemically bonded with each other to form polymeric catena. The resin are realized as Interpenetrating Polymer Network (IPN) in J. R. Millar, J. Chem. Soc. 1311 (1960), which has improved mechanical properties in comparison with merely resin mixtures (see Encyclopedia of Polymer Science and Engineering (Second Edition 1987, Wiley Interscience) Vol.8, 279 by D. Klempner and L. Berkowski). It is believed that the interpenetrating polymer network is formed in the resin composition of the present invention, so that the resulting article has very excellent physical properties, such as heat resistance and impact resistance. It is also believed that, since the polymerization reaction is carried out under relatively mild conditions for a short period of time, by-reactions, such as trimerization of polyisocyanate and homopolymerization of polyepoxide, occur few, so that the obtained resin hardly have isocyanulate groups or, if exist, is very small amount.

EXAMPLES

The present invention is illustrated by the following Examples which, however, are not to be construed as limiting the present invention to their details.

EXAMPLE 1

A 100 ml flask was charged with 40.5 g of dichloromethane, to which 16.5 g of dimethyltin diiodide ($(CH_3SnI_2)$) and 24.0 g of triphenylantimony diiodide ($Ph_3SbI_2$) were added and mixed for about 1 hour to form an oxazolidone-forming catalyst solution.

Next, 35 g of an epoxy resin (bisphenol A glycidyl ether having an epoxy equivalent of 175, available from Dow Chemical Company as DER-332) containing 0.32 g of benzoyl peroxide was mixed with 3.8 g of the resulting catalyst solution and defoamed under a reduced pressure using a defoaming agent. The resulting solution was mixed with 29.0 g of a carbodiimide-modified diphenylmethane diisocyanate having NCO content 29% (available from Nippon Polyurethane Co. Ltd. as MTL and 16.0 g of 2-ethylhexyl acrylate at room temperature and defoamed. The resulting composition was poured into a mold having a space of 3 mm, and reacted at 80° C. for one hour and then at 120° C. for 2 hours. The resulting opaque article with cream color was hard and tough. The polymer was analyzed by infra-red absorption spectrum and the result showed that the absorptions at 910 cm$^{-1}$ for epoxy groups and 2,250 cm$^{-1}$ for isocyanate groups disappeared and the absorptions of oxazolidone groups or ester groups (1,740 to 1,720 cm$^{-1}$) appeared, but the absorption at 1,705 cm$^{-1}$ was very small.

The article was post-cured at 150° C. for 5 hours and showed a hardness of 80 (ASTM D 2240-68, using an Asker D hardness meter available from Kobunshi Keiki Co., Ltd.) and a heat deformation temperature of 180° C. (ASTM D 648). It was then subjected to a drop impact test in which a stick hammer having a curvature radius of 4 mm and a weight of 670 g dropped from a certain height on the cured article, and the result showed that the article did not cracked even at a height of 60 cm.

EXAMPLES 2 TO 5 AND COMPARATIVE EXAMPLES 1 AND 2

A thermosetting resin composition and a cured article were prepared as generally described in Example 1, with the exception that an oxazolidone-forming catalyst was prepared from the compounds listed in Table 1. The tests for the physical properties were conducted as generally described in Example 1 and the results are shown in Table 1.

TABLE 1

|  | Examples | | | | Comparative Examples | |
|---|---|---|---|---|---|---|
|  | 2 | 3 | 4 | 5 | 1 | 2 |
| Catalyst preparation (Weight ratio in gram) | Ph$_3$SbI$_2$/ ZnBr$_2$ 1.2/0.67 | Me$_2$SnI$_2$/ (Me$_2$N)$_3$PO 0.6/0.3 | Me$_2$SnI$_2$/ Ph$_4$Sb 0.6/0.8 | Ph$_4$SbI/ ZnBr$_2$ 0.8/0.67 | LiBr/ (Me$_2$N)$_3$PO 0.3/1.0 | 2-Et,4-Me imidazole 0.1 |
| Physical properties |  |  |  |  |  |  |
| Hardness | 83 | 80 | 82 | 82 | 80 | 84 |
| Heat deformation temp. (°C.) | 180 | 180 | 190 | 185 | 80 | 120 |
| Drop impact test (cm) | 50 | 40 | 60< | 60< | 10 | 10 |
| Infra-red |  |  |  |  |  |  |
| Isocyanate group | Disappear | Disappear | Disappear | Disappear | Disappear | Disappear |
| Epoxy group | Disappear | Disappear | Disappear | Disappear | Weak | Weak |
| Oxazolidone group | Overlap | Overlap | Overlap | Overlap | Shoulder | Shoulder |
| Ester group | Broad, strong | Broad, strong | Broad, strong | Broad, strong | Shoulder | Shoulder |
| Isocyanulate group | Shoulder, weak | Shoulder, weak | Shoulder, weak | Shoulder, weak | Strong | Strong |

EXAMPLES 6 TO 14 AND COMPARATIVE EXAMPLES 3 TO 5

A thermosetting resin composition and a cured article were prepared as generally described in Example 1, with the exception that the oxazolidone-forming catalyst and the radical polymerization initiator were those listed for Example 2 and the other components were changed as shown in Table 2. The tests for the physical properties were conducted as generally described in Example 1 and the results are shown in Table 2.

TABLE 2

|  | Examples | | | | | | |
|---|---|---|---|---|---|---|---|
|  | 6 | 7 | 8 | 9 | 10 | 11 | 12 |
| Epoxy resin | DEN-431 | YD-128CA | DER-332 | DER-322 | DER-332 | DER-332 | DER-332 |
| (g) | (35) | (43) | 31.5/2.0 | (35) | (35) | (35) | (35) |
| Isocyanate resin | MTL | MTL | MTL | MR-200 | MTL | MTL | MTL |
| (g) | (29) | (29) | (29) | (27) | (29) | (29) | (29) |
| Unsaturated monomer | EHA | EHA | EHA | EHA | ST | EHA/BADA | EHA/TMPA |

TABLE 2-continued

| (g) | (16) | (16) | (16) | (16) | (16) | 15/1 | 15.6/0.4 |
|---|---|---|---|---|---|---|---|
| Physical properties | | | | | | | |
| Hardness | 79 | 77 | 80 | 78 | 85 | 79 | 77 |
| Heat deformation temp. (°C.) | 195 | 155 | 180 | 195 | 190 | 175 | 170 |
| Drop impact test (cm) | 50 | 60< | 50 | 45 | 45 | 50 | 60< |
| Infra-red | | | | | | | |
| Isocyanate group | Disappear | Disappear | Disappear | Disappear | Disappear | Disappear | Disappear |
| Epoxy group | Disappear | Disappear | Disappear | Disappear | Disappear | Disappear | Disappear |
| Oxazolidone group | Broad strong | Broad strong | Broad strong | Broad strong | Strong | Broad strong | Broad strong |
| Ester group | Overlap ↑ | Overlap ↑ | Overlap ↑ | Overlap ↑ | — | Overlap ↑ | Overlap ↑ |
| Isocyanulate group | Shoulder weak | Shoulder weak | Shoulder weak | Shoulder weak | Shoulder weak | Shoulder weak | Shoulder weak |

| | | Examples | | Comparative Examples | | |
|---|---|---|---|---|---|---|
| | | 13 | 14 | 3 | 4 | 5 |
| Epoxy resin | | DER-332 | DER-322 | DER-431 | DEN-332 | DER-332 |
| (g) | | (35) | (35) | (35) | (35) | (35) |
| Isocyanate resin | | MTL | MTL | MTL | MTL | MTL |
| (g) | | (29) | (29) | (27) | (29) | (29) |
| Unsaturated monomer | | EHA/DAP | EHA/ST/UPE | — | — | MMA |
| (g) | | 15/1 | 8/4/4 | | | (16) |
| Physical properties | | | | | | |
| Hardness | | 80 | 83 | 85 | 83 | 85 |
| Heat deformation temp. (°C.) | | 180 | 195 | 195 | 200 | 185 |
| Drop impact test (cm) | | 50 | 45 | 35 | 25 | 20 |
| Infra-red | | | | | | |
| Isocyanate group | | Disappear | Disappear | Disappear | Disappear | Disappear |
| Epoxy group | | Disappear | Disappear | Disappear | Disappear | Disappear |
| Oxazolidone group | | Broad strong | Broad strong | Strong | Strong | Broad strong |
| Ester group | | Overlap ↑ | Overlap ↑ | — | — | Overlap ↑ |
| Isocyanulate group | | Shoulder weak | Shoulder weak | Shoulder weak | Shoulder weak | Shoulder weak |

DEN-431: novolac type glycidyl ether (epoxy equivalence 175, available from Dow Chemical Company)
YD-128-CA: bisphenol A glycidyl ether (epoxy equivalence 210, available from Toto Kasei Co., Ltd.)
TETRAD-X: N,N,N',N'-tetraglycidyl-m-xylenediamine available from Mitsubishi Gaskagaku Co., Ltd.
MR-200: crude diphenylmethane diisocyanate (NCO content 29%, available from Nippon Polyurethane Co., Ltd.)
MMA: methyl methacrylate
St: styrene
DAP: diaryl phthalate
TMPA: trimethylolpropane triacrylate
BADA: bisphenol A hexapropyleneglycol diacrylate
UPA: fumaric acid/isophthalic acid/propylene glycol (50/50/100 mol ratio)

As is apparent from the above results, the interpenetrating polymer network (IPN) polymer obtained in the present invention has superior heat resistance and impact resistance to conventional polymer mixtures. The resin composition and the article obtained therefrom can be very useful for injection reaction molding, paint, adhesive and the other applications.

What is claimed is:

1. A thermosetting resin composition comprising:
(a) a polyisocyanate compound,
(b) a polyepoxide compound,
(c) a radical polymerizable compound selected from the group consisting of a vinyl aromatic monomer and a (meth)acrylate represented by

CH$_2$=CR$_1$—CO—OR$_2$ wherein R$_1$ represents a hydrogen atom or a methyl group, R$_2$ represents an aliphatic group having 4 to 18 carbon atoms, an alicyclic group or an aromatic group,
(d) an oxazolidone-forming catalyst selected from the group consisting of a complex of an organotin halide and hexamethylphosphorictriamide, a complex of an organotin halide and an onium salt, a complex of a stibonium salt and a zinc halide, a complex of an organoantimony halide and an organotin halide and a complex of an organoantimony halide and a zinc halide, and
(e) a radical polymerization initiator; said polyisocyanate compound (a) and polyepoxide compound (b) being present in a functional group equivalent ratio of isocyanate group: epoxy group within the range of 1:2 to 2:1 and said radical polymerizable compound (c) being present in an amount of about 1 to 100 parts by weight based on the total amount of the polyisocyanate compound (a) and the polyepoxide compound.

2. The thermosetting resin composition according to claim 1 wherein said polyisocyanate compound (a) includes an aromatic polyisocyanate and an aliphatic or alicyclic polyisocyanate.

3. The thermosetting resin composition according to claim 1 wherein said polyisocyanate compound (a) is carbodiimide modified diphenylmethane diisocyanate or diphenylmethane diisocyanate.

4. The thermosetting resin composition according to claim 1 wherein said polyepoxide compound (b) has at least two epoxy groups in one molecule.

5. The thermosetting resin composition according to claim 1 wherein said polyepoxide compound (b) has 2 to 4 epoxy groups in one molecule and an epoxy equivalent of 90 to 500.

6. The thermosetting resin composition according to claim 1 wherein said polyepoxide compound (b) is selected from the group consisting of a diglycidyl ether of bisphenol A prepared from bisphenol A and epihalohydrine; a diglycidyl ether of bisphenol F; a resin derived from a polynuclear phenol glydidyl ether; an epoxide phenyl novolac resin; an aromatic glycidylamine resin derived from an aromatic amine and epichlorohydrine; a glycidyl ester resin of a polybasic aromatic, aliphatic or alicyclic carboxylic acid; a glycidyl ether of a reaction product from an aromatic or alicyclic dicarboxylic acid and a polyol; a glycidyl ether of a polyol; an epoxidized cycloolefin; an epoxidized unsaturated compound from plant oil or a modified thereof; an epoxide of a silicate compound; and a mixture thereof.

7. The thermosetting resin composition according to claim 1 wherein said organotin halides is selected from the group consisting of trimethyltin iodide, trimethyltin bromide, dimethyltin diiodide, dimethyltin dibromide, tripropyltin iodide, tripropyltin bromide, dipropyltin diiodide, dipropyltin dibromide, tributyltin iodide, tributyltin bromide, dibutyltin diiodide, dibutyltin dibromide, trioctyltin iodide, trioctyltin bromide, dioctyltin diiodide, dioctyltin dibromide, triphenyltin iodide, triphenyltin bromide, diphenyltin diiodide, diphenyltin dibromide, tricyclohexyltin iodide, tricyclohexyltin bromide and dicyclohexyltin diiodide, dicyclohexyltin dibromide.

8. The thermosetting resin composition according to claim 1 wherein said onium salt includes ammonium, phosphonium, stibonium, which is represented by the following formula (2)

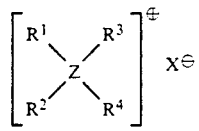

wherein Z is N, P or Sb, $R^1$ to $R^4$, which are same or different, represent an organic group, X represents a halogen atom.

9. The thermosetting resin composition according to claim 1 wherein said organoantimony halide is selected from the group consisting of triphenylantimony diiodide, triphenylantimony dibromide, tribenzylantimony diiodide, tribenzylantimony dibromide, tributylantimony diiodide and tributylantimony dibromide.

10. The thermosetting resin composition according to claim 1 wherein said catalyst is prepared by mixing about equimolar amount of the components at room temperature to 150° C. in the presence or absence of a solvent.

11. The thermosetting resin composition according to claim 1 wherein said catalyst is present in the composition in an amount of 0.01 to 10 parts by weight, based on 100 parts by weight of the mixture of the polyepoxide and the polyisocyanate.

12. The thermosetting resin composition according to claim 1 wherein said catalyst constituent reactant is mixed with either the polyepoxide or the polyisocyanate without forming the complex catalyst, wherein the polyepoxide or the polyisocyanate is used as a solvent of the catalyst constituent material.

13. The thermosetting resin composition according to claim 1 wherein said radical polymerizable compound (c) is selected from the group consisting of n-butyl (meth)acrylate, isobutyl (meth)acrylate, t-butyl (meth)acrylate, amyl (meth)acrylate, hexyl (meth)acrylate, 2-ethylhexyl (meth)acrylate, lauryl (meth)acrylate, stearyl (meth)acrylate, cyclohexyl (meth)acrylate; isobornyl (meth)acrylate, dicyclopentenyloxyethyl (meth)acrylate, phenyl (meth)acrylate, phenyloxyethyl (meth)acrylate, styrene, alpha-methylstyrene, vinyltoluene, vinylxylene and vinylstyrene.

14. The thermosetting resin composition according to claim 1 wherein said radical polymerization initiator (e) includes bezoylperoxide, t-buty octanoate, cumene hydroperoxide and azoisobutylonitrile.

15. The thermosetting resin composition according to claim 14 wherein said initiator is present in the composition about 0.1 to about 10 parts by weight based on 100 parts by weight of the total amount of the monomers.

16. The thermosetting resin composition according to claim 1 wherein said composition is divided into two or more packages, provided that the radical polymerization initiator (e) is separated from the radical polymerizable compound (c) and the polyisocyanate compound (a) is separated from the polyepoxide compound (b).

17. An article obtained from said thermosetting resin composition according to claim 1.

18. The article according to claim 17 prepared by mixing said thermosetting resin composition according to claim 1 at room temperature to 150° C. in a mold.

19. The article according to claim 17 wherein said reaction temperature is within the range of 40° to 150° C.

* * * * *